(12) United States Patent
Kori (10) Patent No.: US 6,397,223 B1
(45) Date of Patent: May 28, 2002

(54) FILE MANAGEMENT METHOD USING TRANSPOSED FILE

(75) Inventor: Mitsunori Kori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,113

(22) Filed: Oct. 26, 1999

(30) Foreign Application Priority Data

Jul. 8, 1999 (JP) ............................................. 11-194590

(51) Int. Cl.7 ............................................. G06F 17/30
(52) U.S. Cl. ................ 707/102; 707/1; 707/2; 707/3; 707/101; 707/7; 707/205
(58) Field of Search ........................... 707/3, 102, 101, 707/1, 2, 7, 104, 533, 205; 717/2, 1; 345/804, 968; 705/29; 706/934

(56) References Cited

U.S. PATENT DOCUMENTS

| | | | | |
|---|---|---|---|---|
| 5,327,341 A | * | 7/1994 | Whalen et al. | 705/3 |
| 5,577,242 A | * | 11/1996 | Yamaguchi et al. | 707/205 |
| 5,628,007 A | * | 5/1997 | Nevarez | 707/102 |
| 5,986,652 A | * | 11/1999 | Medl et al. | 345/712 |
| 5,991,753 A | * | 11/1999 | Wilde | 707/2 |
| 6,108,004 A | * | 8/2000 | Medl | 345/804 |
| 6,175,835 B1 | * | 1/2001 | Shadmon | 707/102 |
| 6,289,359 B1 | * | 9/2001 | Ando et al. | 707/1 |

OTHER PUBLICATIONS

Unoki, Masayuki, Sybase IQ, "The approach to the Data Warehouse by the original data structure," Technical Report of The Institute of Electronics, Information and Communication Engineers, AI97–42, DE97–75 (1997–12), pp. 51–56.

* cited by examiner

Primary Examiner—Jean M. Corrielus
(74) Attorney, Agent, or Firm—Burns, Doane, Swecker & Mathis, LLP (57) ABSTRACT

A file management system performs flexible and efficient file management with a transposed file. First, variable-length logical fields constituting the records in an original file are converted to variable-length internal fields with field-to-field correspondence being maintained and fields aligned with word boundaries. Next, the records consisting of internal fields are divided into multiple record groups which may comprise a variable number of records. For each record group, one or a plurality of internal fields of all records are then sorted into blocks and blocks are set in a row as a group. Groups thus generated from all records are assembled into a transposed file. When requested to retrieve field data from the original file, the file management system accesses the transposed file and reads only blocks comprising target field data.

10 Claims, 10 Drawing Sheets

PRIOR ART

FILE MANAGEMENT METHOD USING TRANSPOSED FILE

BACKGROUND OF THE INVENTION

1. Field of the Invention

The present invention relates to a file management method, particularly to an improved file management method aiming at efficient reading of only required data from mass data storage, typically applicable to data retrieval from databases.

2. Description of the Related Art

When retrieving desired data from a file into which data has been stored in units of records, it has been necessary to write an entire record including that data into an input-output buffer to locate and read a field or fields in which the data exists. If, for example, one record constitutes 512 bytes, it has always been necessary to read one record of 512 bytes from the file, even if only 4 bytes of data are needed. Using a corporate employee database as an example, when creating an address book of the members by retrieving their names and addresses from the database, with the above data reading method, it is necessary to read the records for all members from the database to the input-output buffer and retrieve their names and addresses from the records. Because unwanted data will also be read from the database to the input-output buffer, this method is inefficient and unnecessarily increases the processing load.

The present inventor previously proposed a file management method that enables data reading in units of fields of all records rather than in units of records (Japanese Patent Application No. Hei 09-319527, hereinafter referred to as "previous reference").

This file management method is described with reference to FIG. 9. When an original file 1 is assumed to hold a plurality of records 3 consisting of a plurality of fields 2, the records 3 are divided into groups, each group consisting of a predetermined number of records, for example, N records. For each group of records, the sequential fields 2 from the beginning of the records are then sorted according to their relative positions into blocks 4. The sequentially lined blocks 4 within each record group are transferred to the corresponding positions in a row so as to be reorganized into a group 5. The groups 5, thus reorganized from all records 3, are sequentially assembled into a transposed file 6.

By generating the transposed file 6 reorganized in this way, efficient data reading with reduced input/output data amount can be achieved. In the above example of a corporate employee database, in order to retrieve, for example, only the member names from the records 3, only sequential reading of only the block 4 including the corresponding fields 2 is required. There is no need to read other data such as member ID number, age, etc. from this database.

Figure 10:
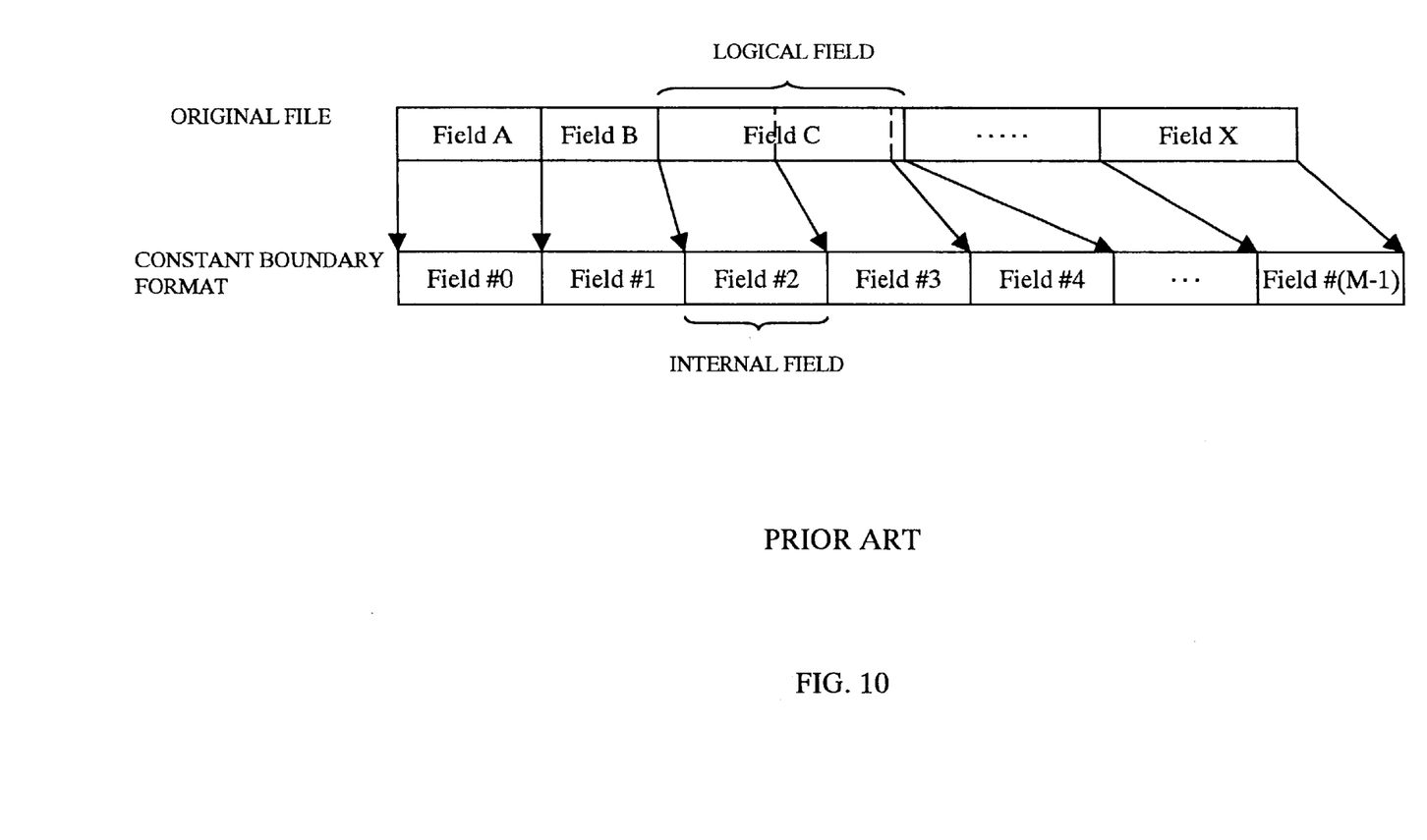
FIG. 10 is an illustration of the field structures for explaining the correspondence between original file's logical fields and internal fields in the previous file management method.

According to the previous reference, all fields 2 constituting blocks 4 (hereinafter referred to as "internal fields") had a fixed length for rapid processing purposes. Especially, the internal fields were aligned with constant boundaries such as word boundaries through consideration of avoiding excessively frequent access for physical input/output to the disk unit of the file system. All fields constituting the original file 1 (hereinafter referred to as "logical fields"), if variable in length, were converted into one or more fixed-length internal fields so as to be coincident with constant boundaries, as shown in FIG. 10. An internal field not filled with the data of the corresponding logical field was padded.

Figure 9:
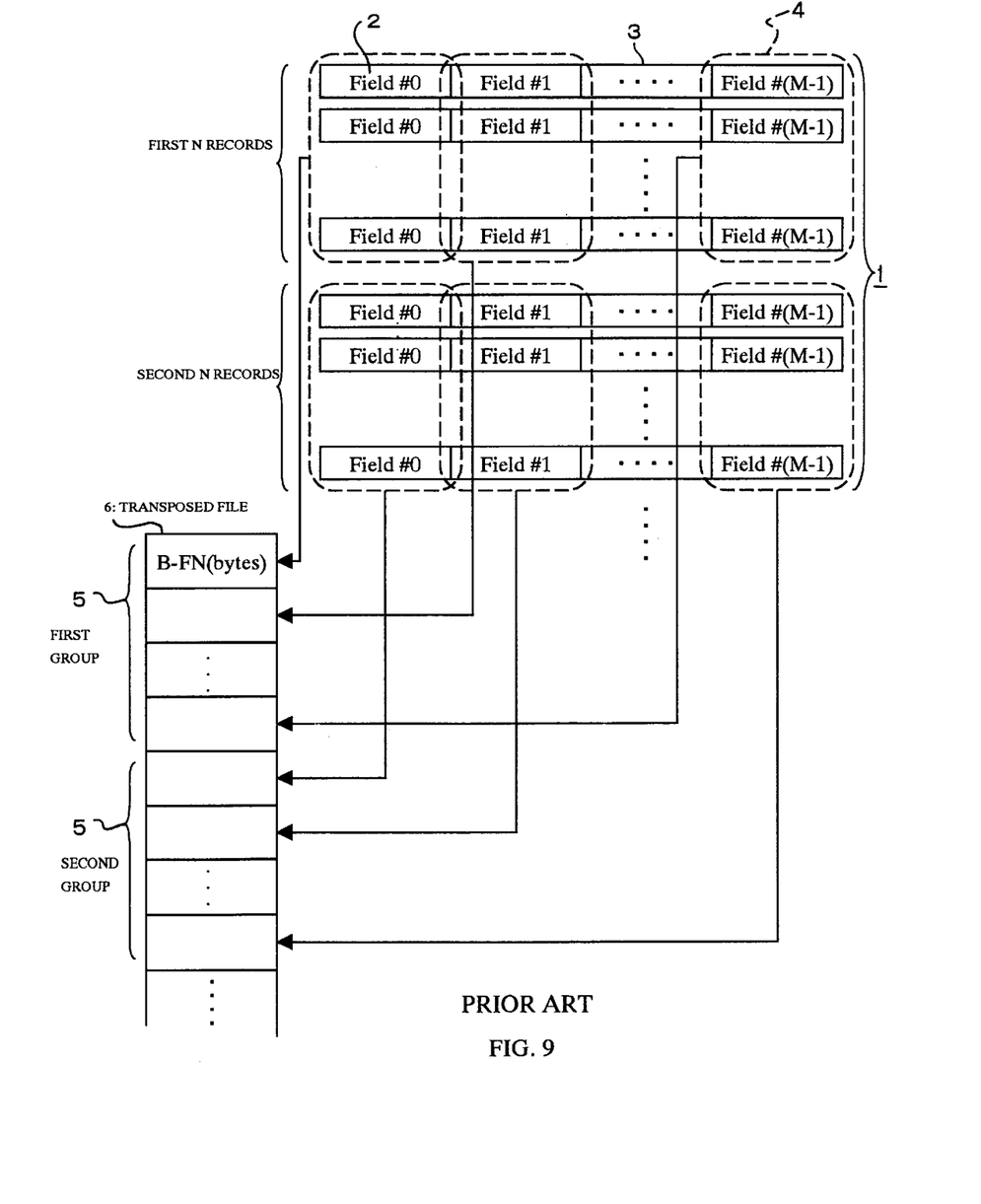
FIG. 9 is a schematic illustration for explaining a method of generating a transposed file used for the previous file management method.

Although the transposed file generating process, as illustrated by FIG. 9, was simplified such that blocks 4 could be generated from the fields 2 constituting the original file 1, this process, in fact, comprised two-stage procedure; one subprocess of converting logical fields into fixed-length internal fields and another subprocess of sorting the internal fields into blocks 4.

In the method according to the previous reference, however, a logical field larger than the internal field size was divided into two or more pieces to fit into internal fields because the internal fields were fixed length. As a result, additional reading must occur for the internal fields generated as the divisions of the logical field.

Furthermore, when internal fields were sorted into blocks, a constant number of fields were assembled into one group. This processing could not always perform efficient data retrieval in further consideration of physical input/output processing dependent on the writing timing and the number of records to be registered into the original file.

SUMMARY OF THE INVENTION

An object of the present invention is to provide an improved file management method that enables more flexible and efficient file management, addressing the drawbacks described above.

A file management method developed to attain such object, according to the present invention, is intended to manage an original file that holds a plurality of records, each of which includes at least one variable-length field. This file management method comprises a field converting step for converting all fields that constitute the records stored into the original file to variable-length internal fields with field-to-field correspondence being maintained; a record group generating step for generating record groups by dividing all records consisting of the internal fields into a plurality of groups; a block generating step for generating blocks by sorting the internal fields of all records within a record group into blocks according to their relative positions so that records' fields in the corresponding position will be assembled into a same group; and a transposed file generating step for generating a transposed file by setting in a row all blocks generated from each record group to reorganize a new group and then setting thus reorganized groups in a row. The transposed file is accessed in response to a request for data reading from the original file.

The field converting step may make all internal fields terminate, aligning with boundaries of physical units for access by adding space area to the internal fields.

The record group generating step may generate record groups comprising a variable number of records and the storage location of target field data is determined by referring to the previously set number of records to constitute an individual record group when the transposed file is accessed.

The block generating step may generate all groups of same size by adding space area to undersized blocks.

The block generating step may also generate blocks comprising a plurality of fields in the corresponding positions in all records in a record group.

Furthermore, the block generating step may assemble non-adjacent fields into one block.

In addition, if the size of a generated block is not equal to an integer multiple of minimum physical input-output units, the block generating step may add space area to the block to adjust the block size to an integer multiple of the minimum input-output units.

According to t he present invention, because o f variable-length internal fields, logical fields constituting the records in an original file are converted to internal fields without being split and field-to-field correspondence is maintained. This can eliminate additional access for physical input/output when reading data of one field, and data reading can thus be rapidly accomplished.

By adding space area to internal fields, all internal fields can terminate, aligned with boundaries of physical units for access, thus achieving efficient reading.

Providing record groups consisting of a fixed number of records, as in the previous method, when completing a record group with some of a predetermined number of records being empty, all records in the group must be read from a disk unit and loaded into a buffer. Then, data is written into empty records and the contents of the buffer are written back into the disk unit. Consequently, even complete records filled with data that would be intact if possible must be read together during this process. The present invention eliminates this bottleneck by allowing all record groups to comprise a variable number of records that are now full with data.

Furthermore, the present invention enables all blocks to be the same size and can enhance the processing efficiency.

The present invention also allows a plurality of internal fields of a record to be assembled from all records of a record group into a block. Because of less frequent access for input/output, efficient reading of a plurality of field's data can be performed.

Especially, if simultaneous use of a plurality of fields positioned separately in a record of an original file is anticipated, these fields of all records in a record group are sorted into a block, thus more efficient reading can be performed.

Furthermore, after a block is generated from internal fields, if its size is not equal to an integer multiple of minimum physical input/output units, padding is used to adjust the block size to the input/output units. The present invention can thus achieve efficient input/output processing.

DESCRIPTION OF THE PREFERRED EMBODIMENTS

Preferred embodiments of the present invention will be described below with reference to the drawings.

Embodiment 1

Figure 1:
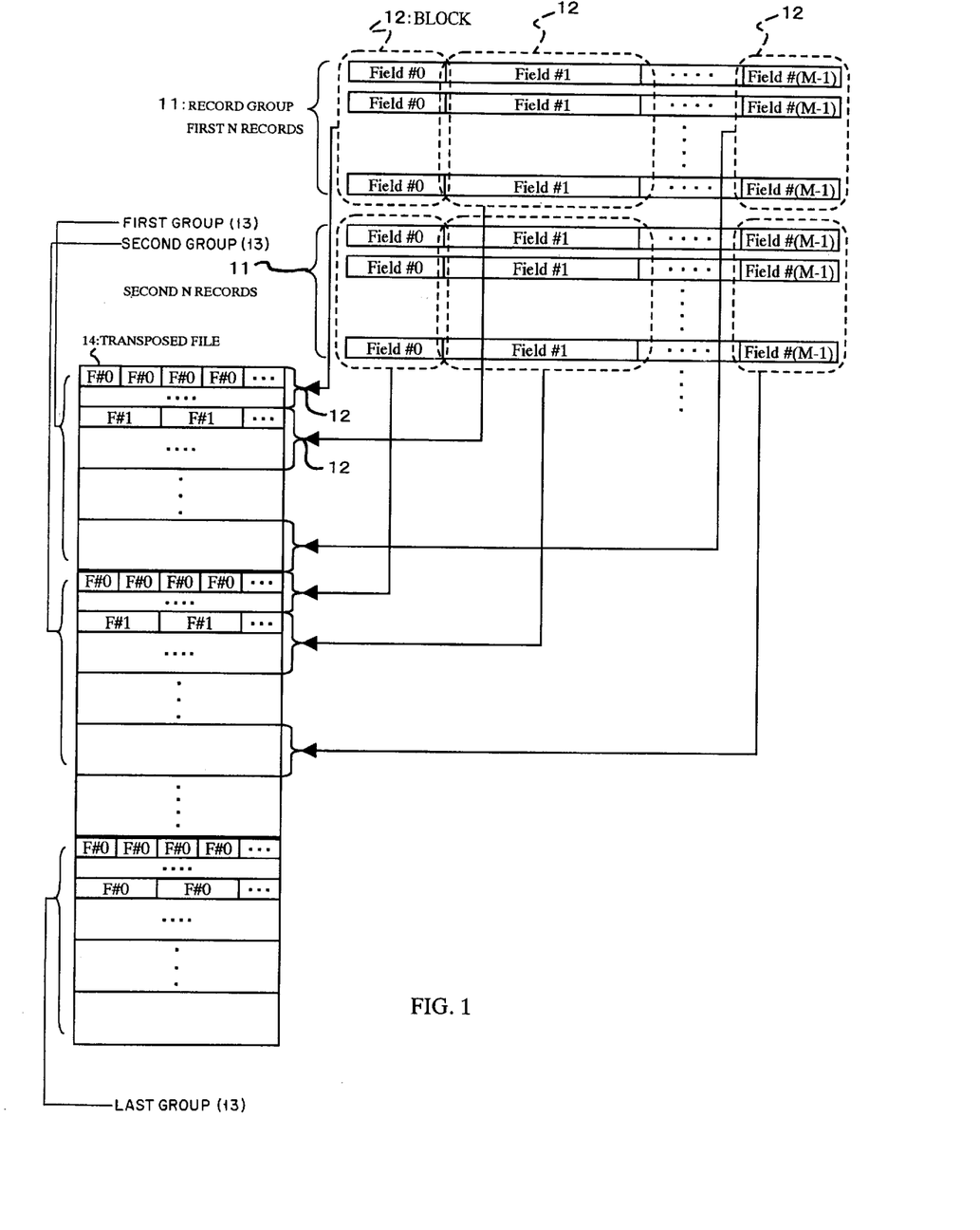
FIG. 1 is a schematic illustration for explaining a method of generating a transposed file used for the file management method according to a preferred Embodiment 1 of the present invention.
Figure 2:
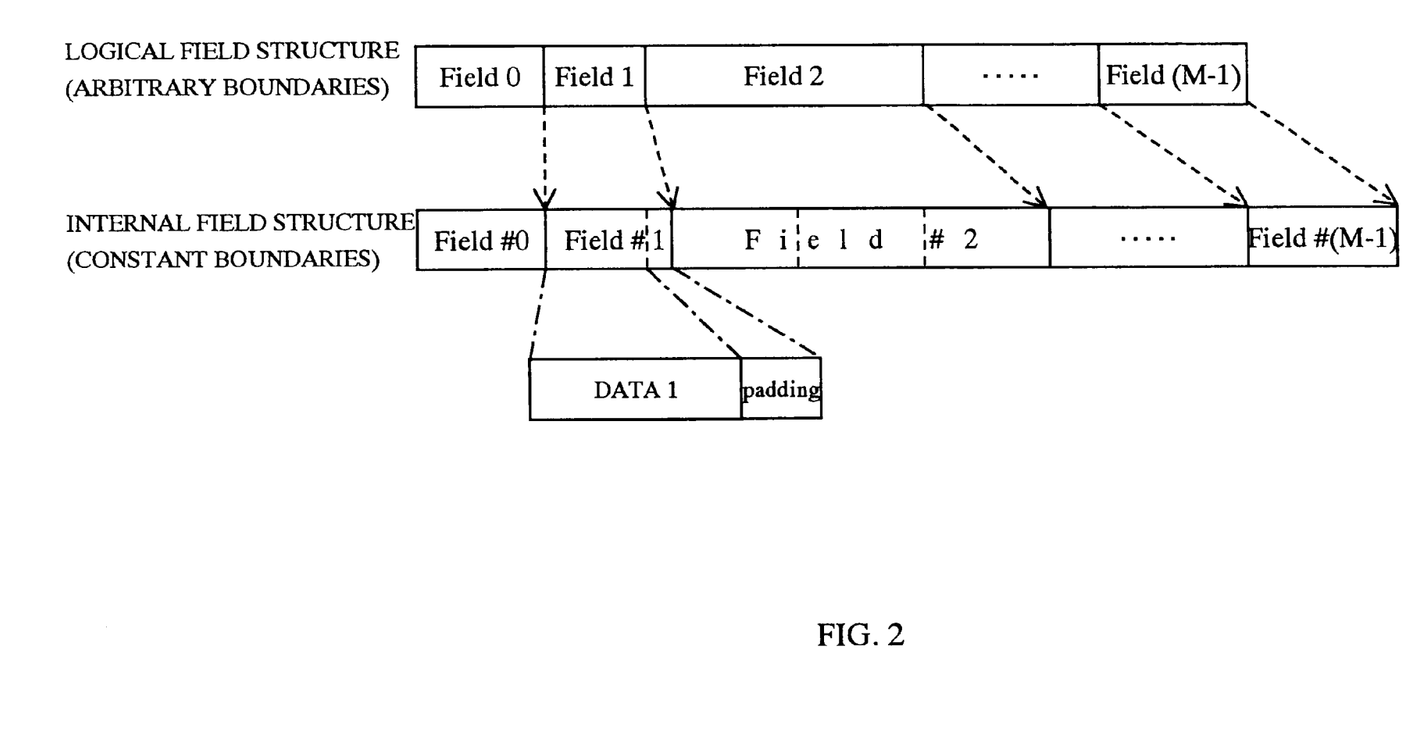
FIG. 2 is an illustration of the field structures for explaining the correspondence between original file's logical fields and internal fields in Embodiment 1.

FIG. 1 illustrates a method of generating a transposed file used for the file management method according to a preferred Embodiment 1 of the present invention. FIG. 2 illustrates the structure of logical fields constituting a record of an original file and the structure of internal fields handled by a file management system according to Embodiment 1, indicating the correspondence between the logical fields and the internal fields. With reference to the flowchart shown in FIG. 3 in addition to these Figs, a transposed file generating process will be explained below.

The procedure for generating a transposed file in Embodiment 1 is fundamentally the same as the corresponding procedure described in the previous reference. This procedure is summarized as follows: the logical fields of an original file are converted to internal fields; the internal fields in the corresponding positions are sorted into blocks; and the blocks are set in a row and assembled into a transposed file. Each step will be detailed below.

Figure 3:
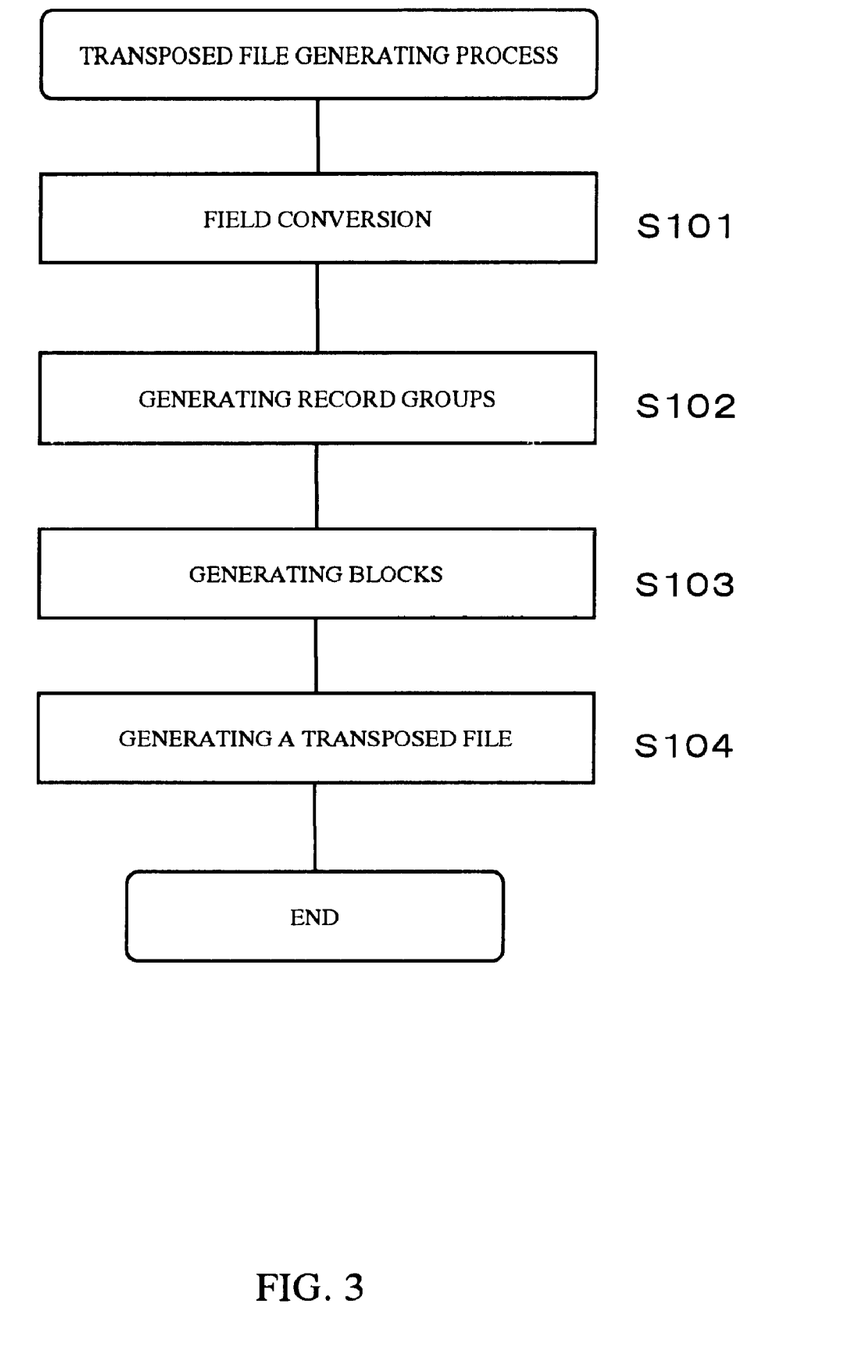
FIG. 3 is a flowchart outlining the transposed file generating process in Embodiment 1.

In a first step 101 of FIG. 3, M pieces of logical fields of an original file, Field 0, Field 1 . . . Field (M-1) are converted to M pieces of internal fields, Field #0, Field #1 . . . Field #(M-1) as shown in FIG. 2. A feature of file management in Embodiment 1 is that the logical fields are converted to variable-length internal fields so that field-to-field correspondence can be maintained. In the previous corresponding process, because all internal fields had fixed same length, a variable-length logical field was allocated to one or more internal fields according to its length. A logical field longer than the internal field length had to be divided into two or more internal fields and consequently additional access in physical input/output units was required to read the data in one logical field, which was not always efficient. Generally, it is often efficient to access at a time the data in adjacent fields at successive addresses in the memory. If one logical field's data, when stored into the buffer, is split and located at dispersive addresses, efficient processing for data retrieval would not be expected. Thus, Embodiment 1 of the present invention has adopted variable-length internal fields and the length of an internal field is set, according to the length of the corresponding logical field.

In Embodiment 1, furthermore, in order to enhance the processing efficiency, adjustment is made so that internal fields will terminate, aligning with constant boundaries, for example, word boundaries. Specifically, space area is added to an internal field, as necessary, to align the end of the field with a word boundary, and padding characters are inserted into the space area as shown in FIG. 2. The size of the space area corresponds to the difference between the length of a logical field and the length of the corresponding internal field, taking account of constant boundaries. As seen from the correspondence between Field 1 and Field #1 in FIG. 2, therefore, the length of a logical field is not always identical to the length of the corresponding internal field. Although FIG. 2 illustrates an example wherein padding characters are inserted into following the data in the field, what portion of one internal field is padded and the number of padding characters to be inserted are not limited.

After the conversion of the records contained in the original file to the records consisting of internal fields in the above procedure, the records are divided into record groups 11 (step 102). As in the corresponding process described in the previous reference, the records in the original file are evenly divided in units of predetermined N records into record groups 11 of same size, according to the present invention of Embodiment 1.

Within each group 11, blocks 12 are then generated (step 103). This step is the same for all record groups 11. An equal number of blocks are generated for all record groups 11. According to Embodiment 1, the records in a group are decomposed into internal fields which are sequential in a line from the beginning of the records. The internal fields are sorted according to their relative positions into blocks 12. As shown in FIG. 1, one block 12 in one record group 11 is generated by assembling the internal fields, for example, Field #0, in the corresponding position in the records, for example, from record number 1 to record number N. In other words, after the records are disassembled in to sequentially lined internal fields, the internal fields in one row are assembled into one block. As a result, blocks 12 as many as the number of internal fields of a record are generated for each record group 11. From fixed N records constituting each group, the process of generating blocks by sorting internal fields into blocks according to their relative positions in Embodiment 1 is the same as in the previous reference described above.

Finally, a transposed file is generated (step 104), wherein the blocks 12 generated for each record group 11 are first set sequentially in a row, thus creating a new group. According to FIG. 1, this may be understood as if horizontal (lined) blocks 12 were sequentially (set in a row) registered into a file of group. This process creates several groups 13 that correspond to several record groups. When all blocks are generated from all record groups 11, all groups 13 are set in a row, thus generating a transposed file 14. Record groups 11 and corresponding groups 13 comprise the same internal fields, but have different internal structure because of sorting and transposition of the internal fields. Thus, different reference numbers are assigned to record groups and groups to indicate different components.

In this way, from a single original file, a single transposed file is generated wherein the fields have been transposed.

The processing efficiency for data retrieval can be enhanced by generating the transposed file 14 in advance, as described above, and accessing the transposed file whenever the file system is requested to read specific data from the original file. This is a noticeable aspect of the file management method according to Embodiment 1. Next, record reading based on this method will be described below.

If the file system receives a request for the retrieval of specific data from a company's employee database, e.g., all data from logical fields 1 into which, for example, "name" data is assumed to have been stored, the system will access the transposed file 14 and retrieve the data from internal Field #1 corresponding to logical Field 1. Because the transposed file 14 contains Field #1 in blocks, the file management system must read only the blocks of Field #1 from all groups 13 in the transposed file 14. If the original file is directly accessed and contains Field #1 from where reading is burdensome, the access may extend throughout the original file. The access to the transposed file 14 in which the blocks of Field #1 are separate from other blocks enables efficient reading of "name" data without reading unwanted data.

According to Embodiment 1, the procedure of generating the transposed file from the original file is basically the same as described in the previous reference, except that variable-length internal fields are used. Because the variable-length internal fields resolve the problem of the split of a single field's data when the data is stored into the transposed file 14, too frequent access for physical input/output can be prevented.

Generally, if internal fields are very shorter than logical fields, there is a risk of the decrease of processing efficiency, because the storage locations may become dispersive. Inversely, if internal fields are very longer than logical fields, useless area is generated in the storage device, as far as the previous file management method being concerns. Such problems may arise from the fixed-length internal fields that were used in the previous method, though the length of logical fields was different field by field. The various-length internal fields adopted in Embodiment 1 can resolve double problems successively. These internal fields are compatible with logical fields, that is, short internal fields to short logical fields and long internal fields to long logical fields. This adaptive length of internal fields, properly adjustable, prevents the processing efficiency from decreasing and minimizes useless storage area. Of course, these internal fields can be padded to be aligned with constant boundaries as described above.

Embodiment 2

Figure 4:
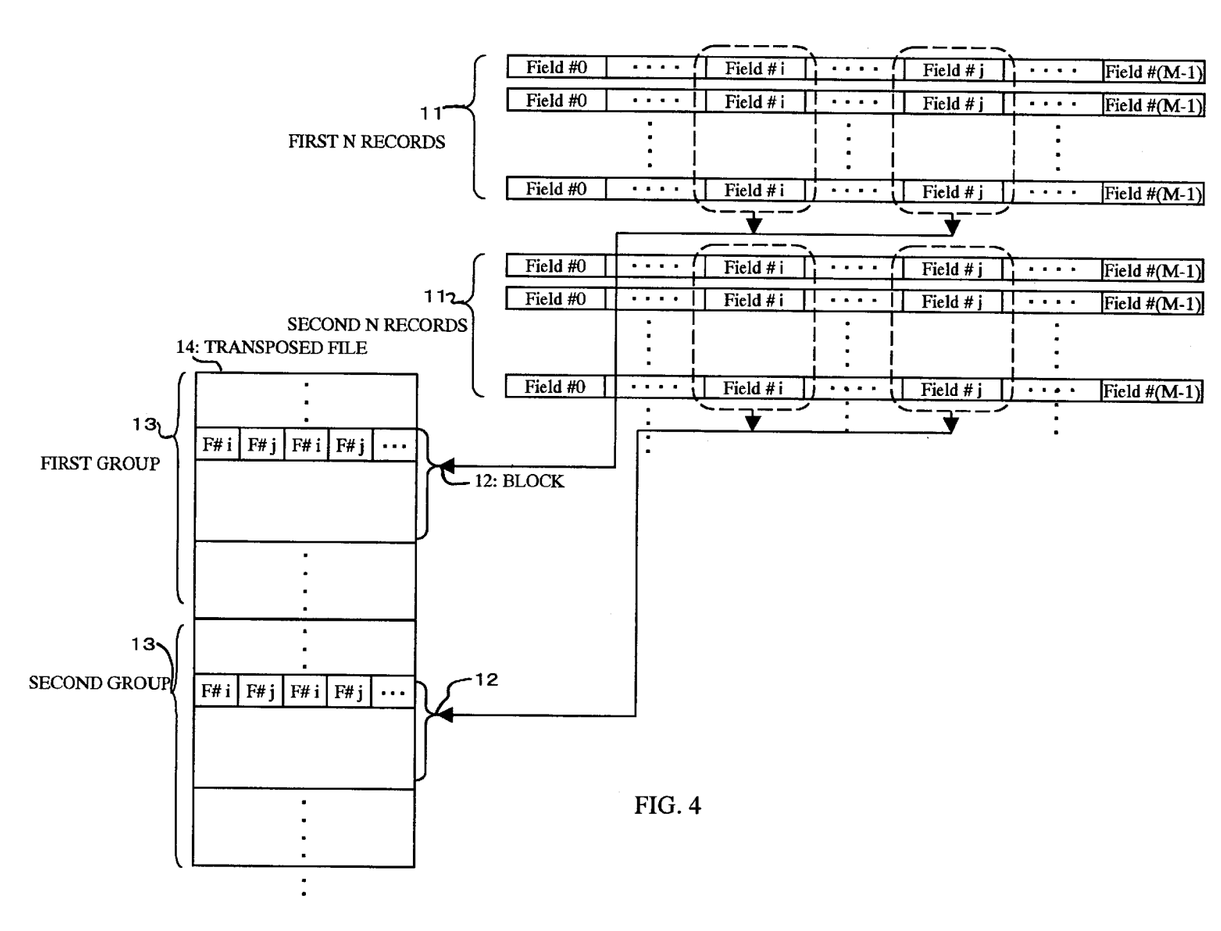
FIG. 4 is a schematic illustration for explaining a method of generating a transposed file used for the file management method according to a preferred Embodiment 2 of the present invention.

FIG. 4 illustrates a method of generating a transposed file used for the file management method according to a preferred Embodiment 2 of the present invention.

In an example of a corporate employee database retaining records each consisting of the data fields for member ID number, name, hiring date , department/section, age, and address in this order. If an address book of the members is created by retrieving only "name" and "address" data from this database, "name" and "address" data are likely to be read separately, even if reading is executed, based on the method of Embodiment 1 described above. This is because the field for "name" registration and the field for "address" registration are not positioned adjacent to each other in the records and therefore access to different storage locations is required for input/output.

In the above description of Embodiment 1, all records contained in an original file are decomposed into discrete internal fields and the internal fields are sorted according to their relative positions into blocks when a transposed file is generated. Embodiment 2, however, makes it possible for internal fields positioned separately in the records to be associated with each other and blocks comprising a plurality of internal fields are generated. According to Embodiment 2, if certain fields positioned separately in the original file are anticipated to be used frequently, the fields are assembled into one block when a transposed file is generated. This can further enhance reading efficiency.

The process of generating a transposed file according to Embodiment 2 is as follows. First, the records are decomposed into discrete internal fields that are sequential in a line from the beginning of the records in the block generating process shown in FIG. 3 (step 103). Then, a plurality of internal fields for which storage in a same block 12 is desirable are selected and assembled into blocks. Other processes are similar to Embodiment 1 and their explanation will not be repeated.

Indexing is generally used as a means for improving the efficiency of search and retrieval performance of a file system. Indexing techniques are applicable to the present invention of Embodiment 2 and other Embodiments. Indexing allows the file system to skip the input/output units (e.g., disk sectors, clusters, etc.) not including target records. In order to enhance the indexing effect, it is desirable to reduce the number of records per input/output unit. This is because, even if an input/output unit includes only a single target record, reading throughout the unit is required. One possible method of reducing the number of records per input/output unit is extending internal fields. However, if internal fields are simply extended, the area to be padded also increases and the efficiency of storage area use decreases.

According to Embodiment 2, different internal fields for different data items are assembled into one block when blocks are generated, thus reducing the number of blocks, or in other words, transposed records per minimum input/output unit for access. This can enhance the indexing effect and prevent the decrease of the efficiency of storage area use.

Although, as a noticeable example of the effectual aspect of Embodiment 2, the above context explained a case where one block comprises non-adjacent internal fields, one block comprising adjacent internal fields may be generated.

Embodiment 3

Figure 5:
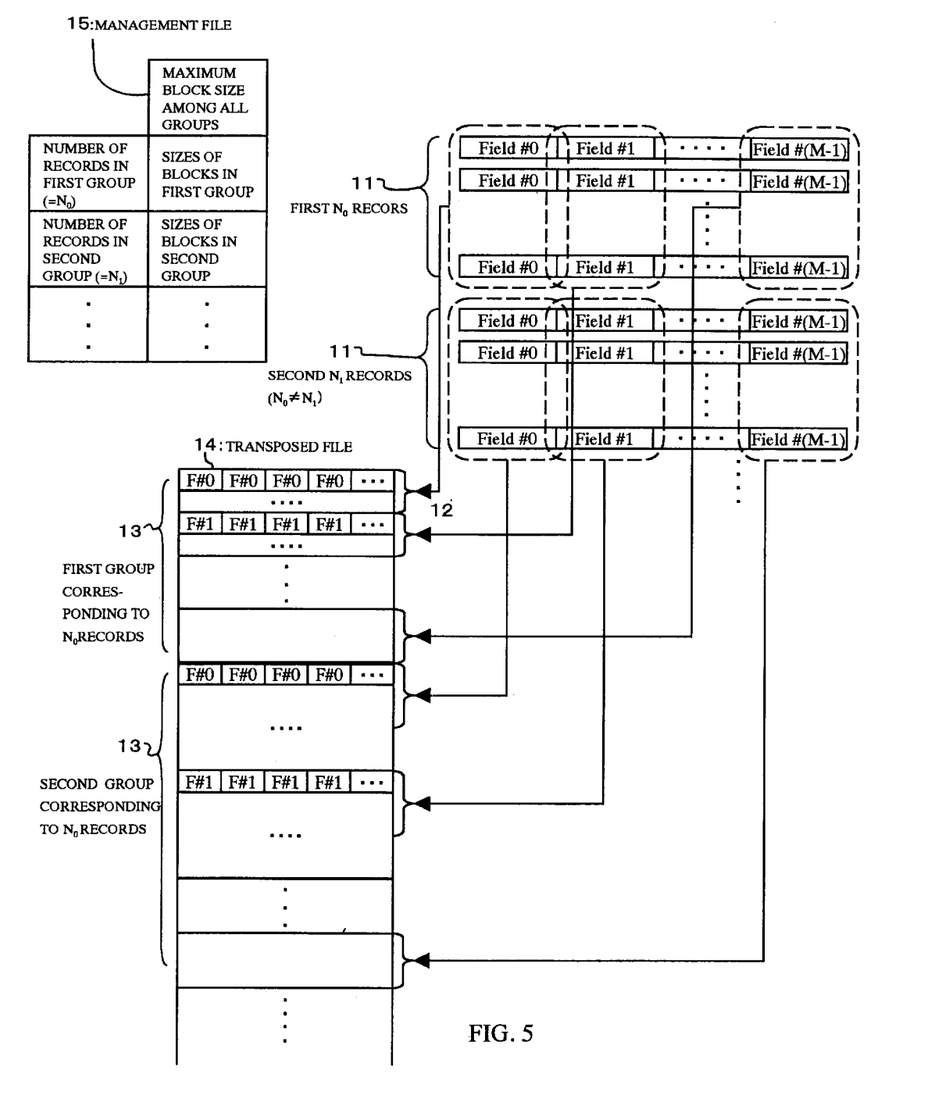
FIG. 5 is a schematic illustration for explaining a method of generating a transposed file used for the file management method according to a preferred Embodiment 3 of the present invention.

In contrast with Embodiment 1 above wherein the number of records constituting each record group is constant, a feature of Embodiment 3 is that a variable number of records constitute a group. FIG. 5 illustrates a method of generating a transposed file used for the file management method according to a preferred Embodiment 3 of the present invention. For Embodiment 3, a management file 15 is required as means for managing the number of records constituting a record group.

If, for example, daily sales data is sequentially stored into an actual sales database (original file) of a sales management system, the number of records registered into the database differs day by day, as the quantity of sales differs everyday. As in the previous method, fixed N records into which data has been written are assumed to constitute a record group A. If, for example, data in quantity p that is less than the number of records N is generated on a day d, the records are filled by adding the data (N–p) from the records for the next day (d+1) to the record group A. Internal processing to do this is as follows. All records in the record group A are read and loaded into a certain input-output buffer; the data (N–p) from the next day records is written into the space area of the records in the buffer; and the contents of the buffer are written into the disk unit. A so-called read-modify-write procedure must be carried out. When data from records is added to a record group in which some of a predetermined number of records N are empty, all records including those filled with data are always read and loaded into the buffer. This processing is not efficient. According to Embodiment 3, a variable number of records constitute a record group, and thus a different size record group may be generated everyday for the above case. There is no need of reading the records filled with data.

For the process of generating a transposed file according to Embodiment 3, a procedure is similar to that for Embodiment 1 and is executed, as outline in the flowchart shown in FIG. 3. Embodiment 3 differs from Embodiment 1 only in the aspect of the record group generating process (step 102) explained below.

All records consisting of internal fields into which logical fields have been converted in step 101 are divided into a plurality of record groups 11. In Embodiment 3, all records are divided into a plurality of groups, according to the preset number of records for each record group, previously registered in a management file 15.

Before record groups are generated, the number of records to constitute an individual record group and the sizes of all blocks of each record group have been preset in the management file 15. The number of records for each record group can be determined by the corresponding number of records currently registered in the original file. The block sizes can be determined, based on the number of records and the lengths of the fields constituting a record. When the sizes of the blocks of all record groups 11 have been fixed, the management file 15 also retains the maximum block size in addition to every block size.

In step 102, the generation of record groups 11 is carried out by grouping all records in the file according to the preset number of records for each record group $N_0$, $N_1$, etc. maintained by the management file 15. After all records are thus divided into a plurality of record groups, blocks 12 are generated as in Embodiment 1. Then, the blocks 12 are set in a row so as to be reorganized into groups 13 which are in turn sequentially set in a row and assembled into a transposed file 14 as in Embodiment 1.

Figure 6:
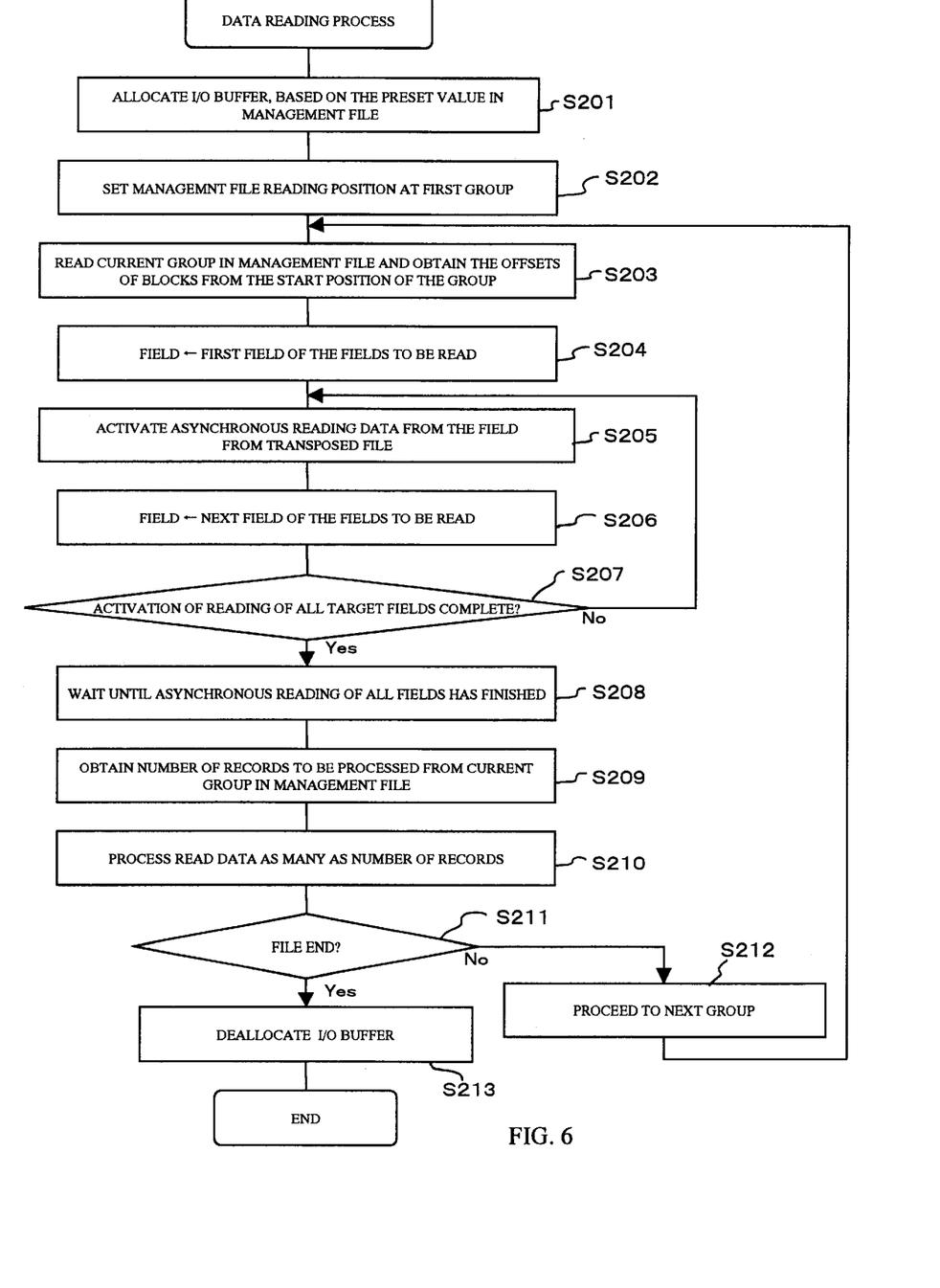
FIG. 6 is a flowchart outlining the data reading process in Embodiment 3.

Next, the procedure for reading of field's data, based on the file management method in Embodiment 3, will be explained below with reference to the flowchart of FIG. 6.

From the transposed file 14, the file management system reads requested field data. During the internal processing for this, blocks containing the requested field data are read and loaded into an input-output buffer. A concern with variable length blocks how large input-output buffer should be prepared to accommodate blocks read from the file. According to Embodiment 3, the maximum block size is retained by the management file 15. It is reasonable to prepare an input-output buffer equivalent to the maximum block size or a multiple of the maximum block size dependent on the number of the items of the fields from which data is to be read.

After allocating an input-output buffer (step 201), the file management system determines the storage location of field data by referring to the preset number of records for each record group retained by the management file 15 and sequentially reads field's data. Specifically, the file management system sets the reading position in the management file 15 at a first group (step 202), and obtains the offsets, or, in other words, the relative positions of the blocks constituting the group from the beginning of the group (step 33). The off set scan be easily obtained because the record format is known.

When the start position of each group and the offsets of all blocks in the group are thus determined, based on the preset values retained by the management file 15, the file management system can find out the storage position of target field's data to be read (step 204). Then, the system sequentially reads target field data from the specific block in the specific group from the transposed file 14 (steps 205 through 210). In Embodiment 3, reading from the transposed file is executed in an asynchronous manner. When the processing for the first group is complete, the processing for the next group begins, and, eventually, the above reading procedure is executed for all groups constituting the transposed file 14 (steps 211 and 212).

When field data reading for all groups 13 is complete, the input-output buffer is deallocated (step 213).

According to Embodiment 3, by simply providing the management file of data structure shown in FIG. 5, field's data reading can easily be executed even if record groups 11 consist of a variable number of records.

Although Embodiment 3, as described above, is implemented so that a buffer of necessary size can be reserved before the reading process starts, based on the preset maximum block size retained by the management file 15, a necessary buffer may be allocated and released repeatedly each time field's data is read from a block. Because this allows a minimum necessary size of buffer memory area to be allocated, more efficient memory use can be expected. Buffer allocation and deallocation to be executed when necessary is effective particularly for a case where the block size variation is very large.

Although, in the above description of Embodiment 3, the management file 15 is assumed to be provided separately, the management file 15 may be integrated into the transposed file 14. Furthermore, Embodiment 3 may be modified so that both the management file 15 and the transposed file 14 can retain common information such as the number of records for each record group, thus providing a duplex storage for fault preventive measures.

Embodiment 4

In Embodiment 3 above, block size is variable because each individual record group 11 comprises a variable number of records. However, for some applications, a fixed block size may be more convenient for processing. A noticeable aspect of Embodiment 4 is that all blocks contained in the transposed file 14 are of the same size. To adjust block size to the maximum, space area is added to undersized blocks when being assembled into the transposed file 14.

Figure 7:
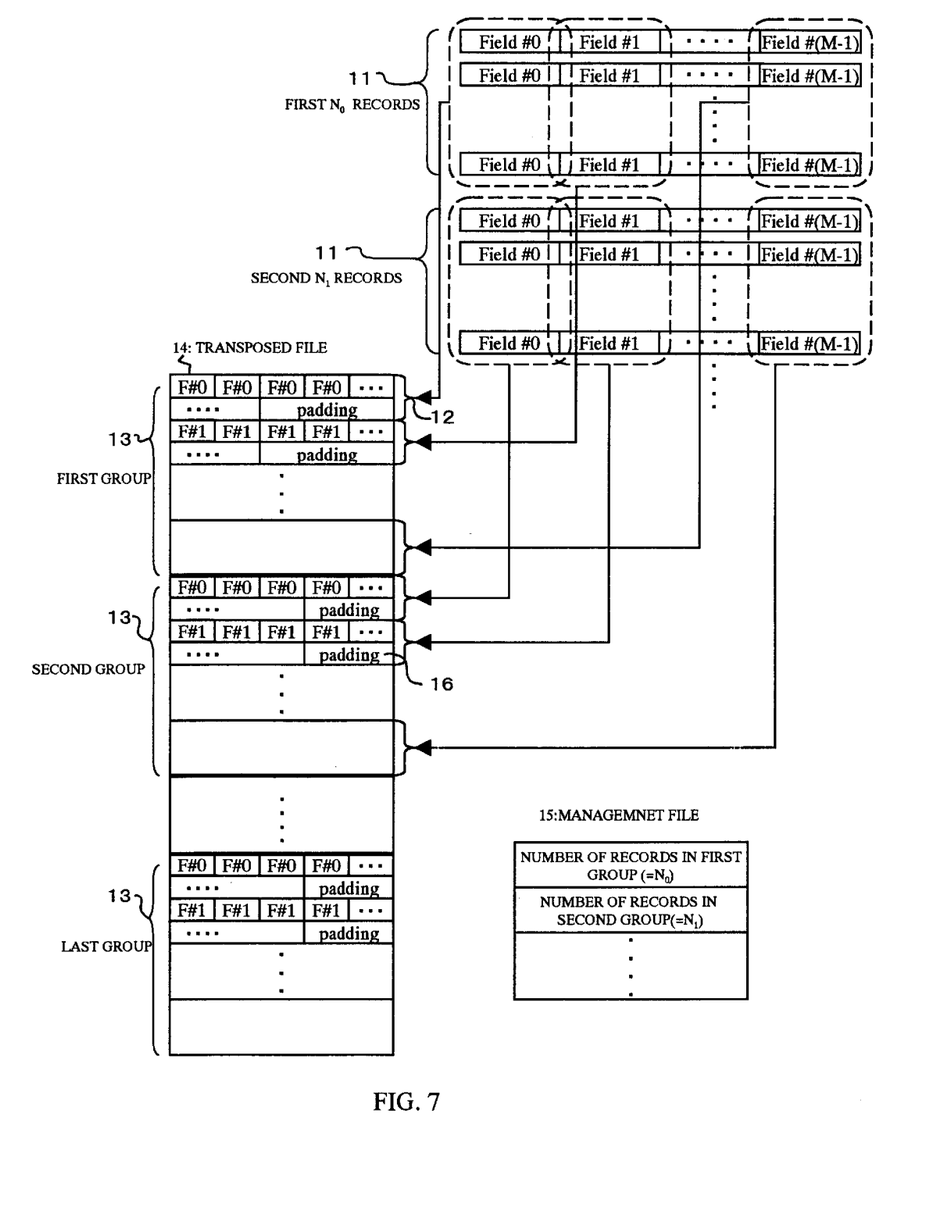
FIG. 7 is a schematic illustration for explaining a method of generating a transposed file used for the file management method according to a preferred Embodiment 4 of the present invention.

FIG. 7 illustrates a method of generating a transposed file used for the file management method according to a preferred Embodiment 4 of the present invention. As seen from the view of the transposed file 14, all blocks are same full size and space area 16 is padded. Unlike in Embodiment 3, the management file 15 used in Embodiment 4 retains only the preset number of records for each record group.

Padding is not limited to actual data writing with padding characters. Some file systems enable logical space area allocation without consuming disk area. When Embodiment 4 is implemented with these file systems, space area can simply be allocated as required without being written with padding characters, and this can save the disk capacity for planned databases.

Embodiment 5

Figure 8:
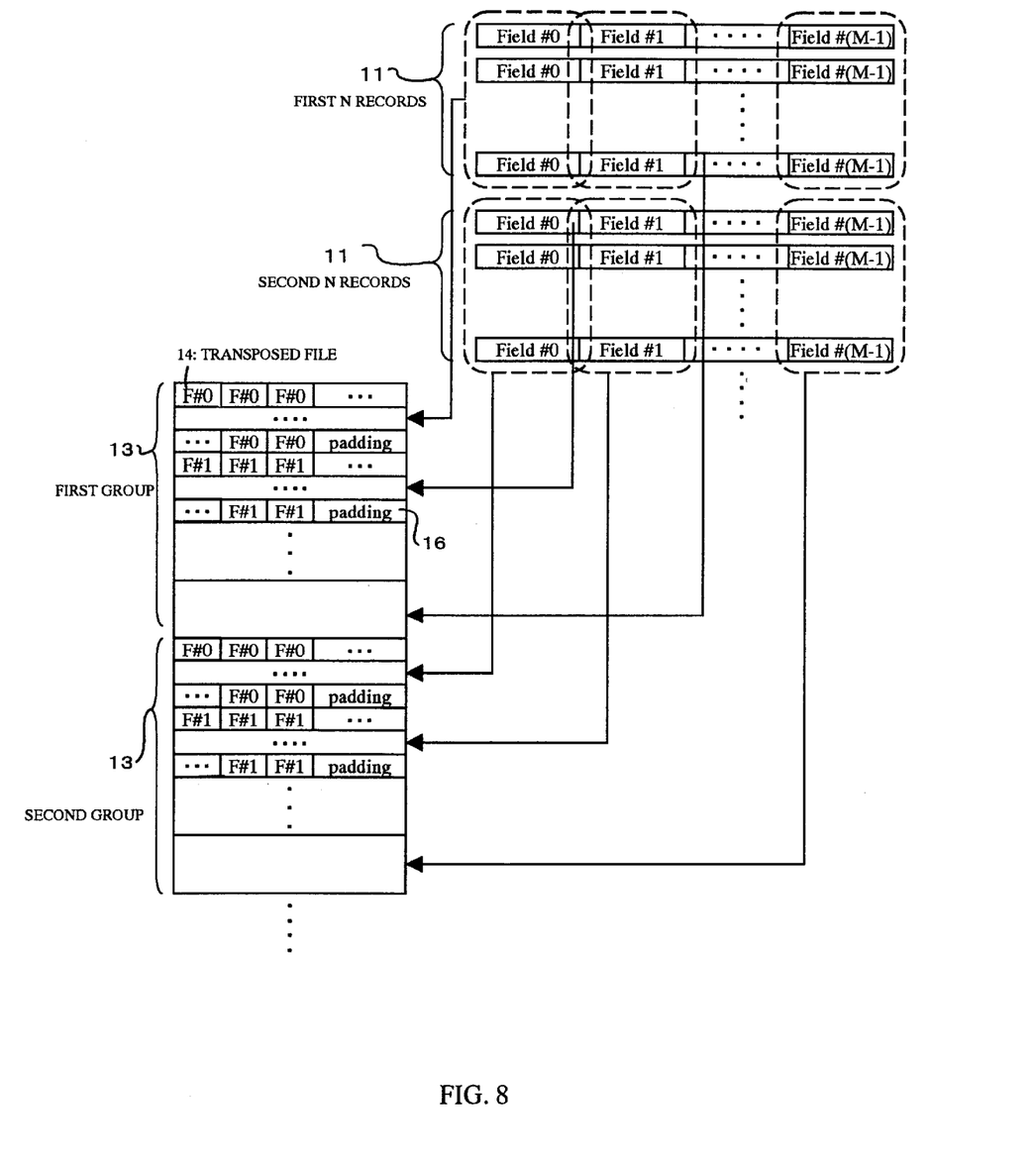
FIG. 8 is a schematic illustration for explaining a method of generating a transposed file used for the file management method according to a preferred Embodiment 5 of the present invention.

FIG. 8 illustrates a method of generating a transposed file used for the file management method according to a preferred Embodiment 5 of the present invention. If the size of a block 12 is not equal to an integer multiple of physical input/output units, padding is used to size the block 12 to an integer multiple of physical input/output units, thus preventing the decrease of processing efficiency. This is a noticeable aspect of Embodiment 5.

For most common storage devices such as disk drives, the minimum physical unit for input/output is fixed. Such minimum units are commonly, and hereinafter, referred to as sector size. If input/output units for accessing files on a disk unit are equal to an integer multiple of sector size, direct input/output between the storage and an input-output buffer can be performed. If not, input/output operation may be executed only by reading the data on the disk to a memory and then copying the data to an input-output buffer.

This is also true for Embodiment 5 and it is desirable to set the size of blocks 12 to an integer multiple of sector size in order to perform efficient input/output operation. As in,the description of the preceding Embodiments, internal fields are aligned with constant boundaries such as word boundaries. However, the size of a block 12 into which internal fields are assembled is not always equal to an integer multiple of sector size. If, for example, sector size is 512 bytes and words are 4 bytes, 10-byte logical fields are converted to 12-byte internal fields, but a block 12 consisting of 12-byte internal fields is not equal to an integer multiple of sector size, because 12×42+8=512.

According to Embodiment 5, after a block 12 is generated from internal fields, if its size is not equal to an integer multiple of sector size, padding is used for adjustment to match the block size with sector size (step 103, FIG. 3). This block size adjustment can achieve efficient input/output processing.

What is claimed is:

1. A file management method for managing an original file that holds a plurality of records, each of which includes at least one variable-length field, comprising:

a field converting step for converting all fields that constitute said records stored into said original file to variable-length internal fields with field-to-field correspondence being maintained;

a record group generating step for generating record groups by dividing all records consisting of said internal fields into a plurality of groups;

a block generating step for generating blocks by sorting said internal fields of all records within a record group into blocks according to their relative positions so that records' fields in the corresponding position will be assembled into a same group; and a transposed file generating step for generating a transposed file by setting in a row all blocks generated from each record group to reorganize a new group and then setting thus reorganized groups in a row;

wherein said transposed file is accessed in response to a request for data reading from said original file.

2. The file management method according to claim 1, wherein said field converting step makes all internal fields terminate, aligning with boundaries of physical units for access by adding space area to said internal fields.

3. The file management method according to claim 1, wherein said record group generating step generates record groups comprising a variable number of records and the storage location of data of a target field is determined by referring to the previously set number of records to constitute an individual record group when said transposed file is accessed.

4. The file management method according to claim 3, wherein said block generating step generates all groups of same size by adding space area to undersized blocks.

5. The file management method according to claim 3, wherein the size of an input-output buffer to temporarily store the field's data read from said transposed file is set equivalent to the maximum block size determined when blocks are generated.

6. The file management method according to claim 3, wherein, each time field's data is read from said transposed file, a minimum necessary size of input-output buffer for storing the read fields data is allocated.

7. The file management method according to claim 1, wherein said block generating step generates blocks comprising a plurality of fields in the corresponding positions in all records in a record group.

8. The file management method according to claim 7, wherein said block generating step assembles non-adjacent fields into one block.

9. The file management method according to claim 1, wherein if the size of a generated block is not equal to an integer multiple of minimum physical input-output units, said block generating step adds space area to the block in order to size the block to an integer multiple of the minimum input-output units.

10. The file management method according to claim 9, wherein said minimum physical input-output units are disk sector size.

* * * * *